United States Patent [19]

Takahashi

[11] Patent Number: 4,532,525

[45] Date of Patent: Jul. 30, 1985

[54] IMAGE FORMING DEVICE

[75] Inventor: Tomohiko Takahashi, Tokyo, Japan

[73] Assignee: Kabushiki Kaisha Toshiba, Kawasaki, Japan

[21] Appl. No.: 614,541

[22] Filed: May 29, 1984

[30] Foreign Application Priority Data

May 31, 1983 [JP] Japan ................................ 58-95007

[51] Int. Cl.³ .............................................. G01D 15/10

[52] U.S. Cl. ................................ 346/76 PH; 400/120

[58] Field of Search ...... 346/76 R, 76 PH, 582–583.4; 400/120, 611, 612, 630–633.2, 624, 662, 659; 219/216 PH, 216 R; 355/23; 358/296, 267–279; 250/317.1, 318, 319

[56] References Cited

U.S. PATENT DOCUMENTS

| | | | |
|---|---|---|---|
| 4,250,511 | 2/1981 | Stein et al. | 346/76 PH |
| 4,410,897 | 10/1983 | Moriguchi et al. | 400/120 |
| 4,458,253 | 7/1984 | Goff, Jr. et al. | 355/23 |

*Primary Examiner*—E. A. Goldberg

*Assistant Examiner*—A. Evans

*Attorney, Agent, or Firm*—Cushman, Darby & Cushman

[57] ABSTRACT

An image forming device comprising sheets of paper which are to be printed, a transfer ribbon having an ink area of four colors which are to be thermally transferred onto the paper sheet, a platen roller for conveying the paper sheet, and a thermal head for heating the transfer ribbon, for thermally multitransferring its colors onto the paper sheet, and for keeping the transfer ribbon forced against the platen roller with the paper sheet interposed between them. Conveying rollers are arranged on that side of the platen roller where the paper sheet comes out of the platen roller, in the forward direction, and consist of a metal roller to the surface of which has adhered a micro-powder such as ceramic and tungsten carbide, and a rubber roller. The conveying rollers are driven but the platen roller is not during the printing operation of the thermal head, and at least one of the platen roller and the conveying rollers is driven during the non-printing operation of the thermal head.

6 Claims, 9 Drawing Figures

IMAGE FORMING DEVICE

BACKGROUND OF THE INVENTION

The present invention relates to an image forming device of the thermal transfer type.

The color printer of the thermal transfer type can be cited as the image forming device of this type. In the case of this printer, two follower pinch rollers are contacted with a platen roller (driving roller) connected to the drive shaft of a motor, and a sheet of paper (which is to be subjected to the thermal transfer) is held between the platen roller and the pinch rollers at the front and last ends thereof. When printing is to be carried out, the pinch rollers are forced against the platen roller, while the ink ribbon and the thermal head are forced against the platen roller and the paper. The platen roller is rotated under this state to carry the paper and the ink ribbon is also carried. Printing is carried out for every line, that is, ink is transferred from the ink ribbon to the paper. Color areas of Y (yellow), M (magenta), C (cyan) and BK (black) repeatedly appear on the ink ribbon for the entire length of the paper. When printing of one color is finished, the ink ribbon and the thermal head are separated from the platen roller and the paper, and the platen roller is inversely rotated to carry back the paper till the first line of printing on the paper is relocated against the thermal head. Three-color printing is similarly repeated. The most important thing is to keep the printing positions of the four colors from shifting.

In the case of the conventional devices, however, the shift of the printing positions can not be avoided for the reasons cited below. The driving platen roller and the follower pinch rollers are usually made of rubber having a large friction coefficient to carry the paper without sliding. When both of these rollers are forced against each other and the thermal head is forced against the platen roller upon printing, the platen roller collapses a little to reform its shape at the points contacting the pinch rollers and the thermal head. On the other hand, the amount of the paper carried is determined by the radius and rotating angle of the platen rollers. When the platen roller collapses even a little, therefore, the radius is reduced and the conveyance of paper can not be thus exactly controlled, thereby causing the printing positions of the second, third and fourth colors to be shifted. It may be previously calculated to what degree they are reformed, but this is unpractical because roller deformation is different for every roller. Furthermore, the fact that the roller deformation is different for three contact points brings about the following drawback. Since the paper is urged against the platen rollers by the pinch roller at the front and last ends thereof and by the thermal head at the middle portion thereof upon printing, as described above, the rotating speeds at the three contact points of the paper are made different when the urging forces become different each other. The paper is therefore bent or made loose during the printing process. The bent paper skews when it is inversely carried back since the paper is not firmly wound around the platen roller.

In addition, that area on the paper on which the printing can be done becomes substantially smaller than the actual length of the paper, because the paper is urged against the platen roller by the pinch rollers at the front and last ends thereof. More specifically, those areas of the paper which are to be located between the contact point of the platen roller and thermal head, that is, the printing point and the front end pinch roller, and between the printing point and the last end pinch roller could not be used for printing.

SUMMARY OF THE INVENTION

The object of the present invention is to provide an image forming device of the thermal transfer type simple in construction and capable of repeatedly printing without shifting or damaging the paper and capable of enlarging a printing area of the paper.

The object of the present invention can be achieved by an image forming device which thermally transfers color from a transfer paper onto a sheet of paper, comprising a platen roller for carrying the paper sheet, a pair of conveying rollers arranged on that side of the platen roller where the paper sheet comes out in the forward direction, an image forming section for urging the transfer paper against the platen roller with the paper sheet interposed between them, and heating the transfer paper to thermally multitransfer color onto the paper sheet, while keeping the paper sheet conveyed in the forward direction, and a driving section for driving the conveying rollers, not the platen roller, during the operation of the image forming section and driving at least one of the conveying rollers and the platen roller when the image forming section is left inoperative.

DETAILED DESCRIPTION OF THE PREFERRED EMBODIMENT

Figure 1:
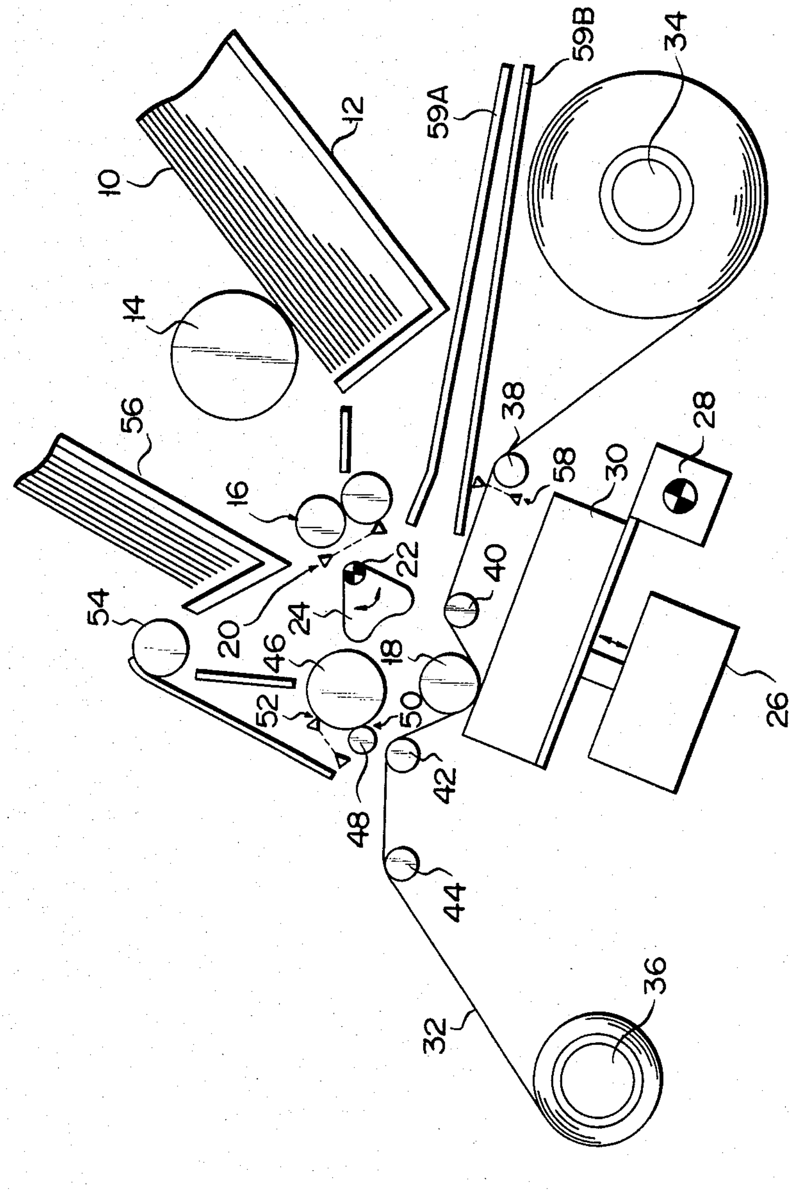
FIG. 1 is a sectional view showing an embodiment of the image forming device according to the present invention.

There will be described an embodiment of the image forming device according to the present invention with reference to the accompanying drawings. FIG. 1 is a perspective view showing a color printer of the thermal transfer type embodied according to the present invention. Sheets of paper 10 which are to be printed are contained in a pile in a paper supply cassette 12. A paper is picked up by a paper feed roller 14 one by one from the top of the piled sheets of paper 10 in the paper supply cassette 12. The paper 10 picked up is aligned by a pair of aligning rollers 16 at the front edge thereof and conveyed toward the platen roller 18. A paper detector 20 is arranged on that side of the paired aligning rollers 16 where the paper comes out of the paired aligning rollers 16 to detect the front and last ends of the paper 10. Arranged between the paper detector 20 and the platen roller 18 is a distributing gate 24 which is swingable around a rod 22. The distributing gate 24 is adapted to leave the paper conveying path free when the paper 10 is fed to the platen roller 18.

Figure 2:
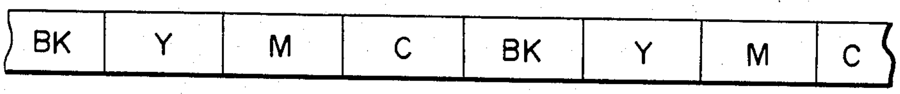
FIG. 2 is a plane view explaining an ink ribbon employed in the device shown in FIG. 1.

The printing face of a thermal head 30 which is rotatable around a rod 28 is contacted with the platen roller 18. The thermal head 30 is usually urged in counterclockwise direction to separate from the platen roller 18, and is rotated in clockwise direction by a solenoid 26 to contact the platen roller 18. An ink ribbon 32 which serves as the thermal transfer paper is sandwiched between the platen roller 18 and the thermal head 30. The four-color ink area of Y, M, C and BK repeatedly appears in this order on the ink ribbon 32, as shown in FIG. 2. This ink area is made longer than the maximum length of any standard sized paper so that the same ink ribbon can be used to print any size of paper. The ink ribbon 32 is stretched between a feed spool 34 and a take-up spool 36, and is guided by guides 38, 40, 42 and 44. The ink ribbon 32 is guided by the guides 40 and 42 to contact the platen roller 18 in such a way that it winds around the platen roller 18 a little. The to-be-printed paper 10 fed from the aligning rollers 16 is conveyed between the platen roller 18 and the ink ribbon 32. The platen roller 18 and the ink ribbon 32 move at this time together with the to-be-printed paper 10, keeping the relation between the platen roller 18 and the ink ribbon 32 unchanged. The moving of the paper 10 by means of the platen roller 18 continues until the front end of the paper 10 reaches a pair of conveying rollers 50 which comprise a driving roller 46 and a follower roller 48. The paper 10 is temporarily stopped when it reaches the paired conveying rollers 50. The platen roller 18 is disconnected from the driving shaft and becomes a follower roller. Then the conveying rollers 50 are driven to stretch the paper sheet 10. Printing is done or ink is thermally transferred of every picture element from the ink ribbon 32 onto the paper 10, while the paper 10 is conveyed. The conveying of the paper 10 upon printing is achieved by the conveying rollers 50. A paper detector 52 is arranged on the outlet side of the conveying rollers 50 to detect the front and last ends of the paper 10. The paper 10 on which four colors have been printed one upon the other is discharged into a paper discharge tray 56 by means of a paper outlet roller 54 where it is stacked. The paper 10 on which each color has been printed is carried back to the paper guides 59A, 59B by the reverse rotation of the conveying rollers 50. Arranged between the guides 38 and 40 is a color detector 58 to detect the colors in the four-color ink area of the ink ribbon 32.

The platen roller 18 is made of rubber. The driving roller 46 and the follower roller 48 which form the paired conveying rollers 50 may also be made of rubber, but the follower roller 48 should be made as a resilient rubber roller and the driving roller 46 as a rigid metal roller whose surface is made rough in micron order to have a large friction coefficient. More concretely, a micro-powder such as ceramic and tungsten carbide is caused to adhere to (or is electrodeposited on) the surface of the metal roller.

Figure 3:
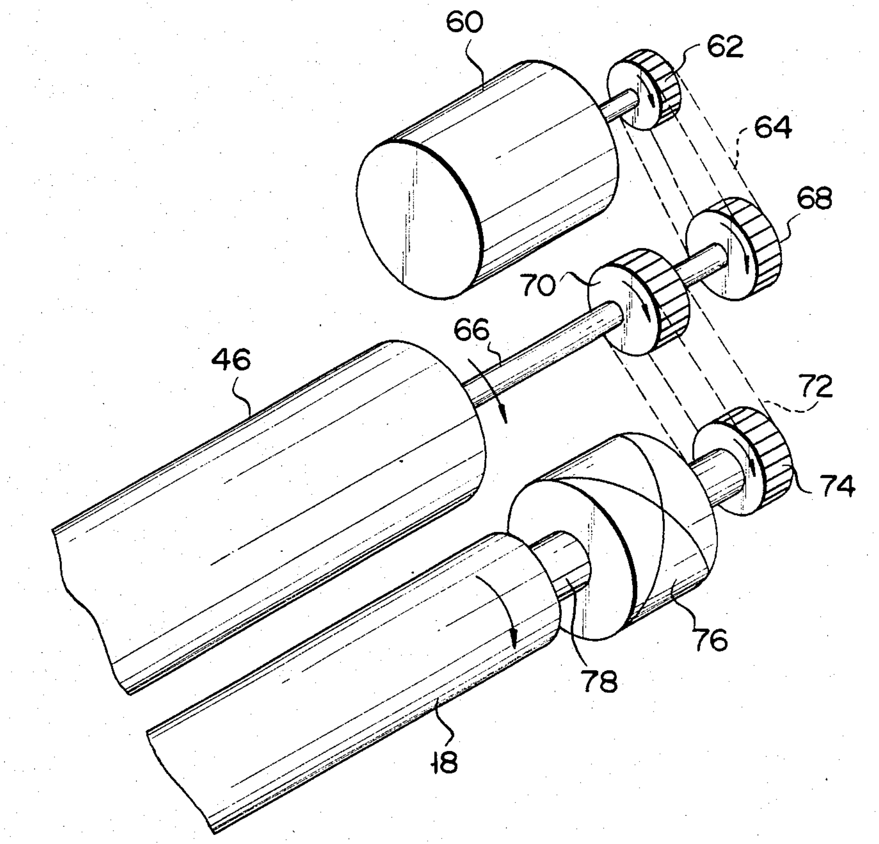
FIG. 3 is a perspective view showing a driving mechanism for driving a platen roller and one of the conveying rollers.

FIG. 3 is a perspective view showing a mechanism for driving the platen roller 18 and the driving roller 46 which is one of the paired conveying rollers 50. A driving pulley 62 is connected to the shaft of a driving motor 60. The rotation of the driving motor 60 and the driving pulley 62 is transmitted via an endless belt 64 to a follower pulley 68 connected to a shaft 66 of the driving roller 46. In addition to the follower pulley 68, another follower pulley 70 is also connected to the shaft 66. The rotation of the shaft 66 and the follower pulley 70 is transmitted to a follower pulley 74 through an endless belt 72. The follower pulley 74 is attached to a shaft 78 of the platen roller 18 through an electromagnetic clutch 76.

Figure 4:
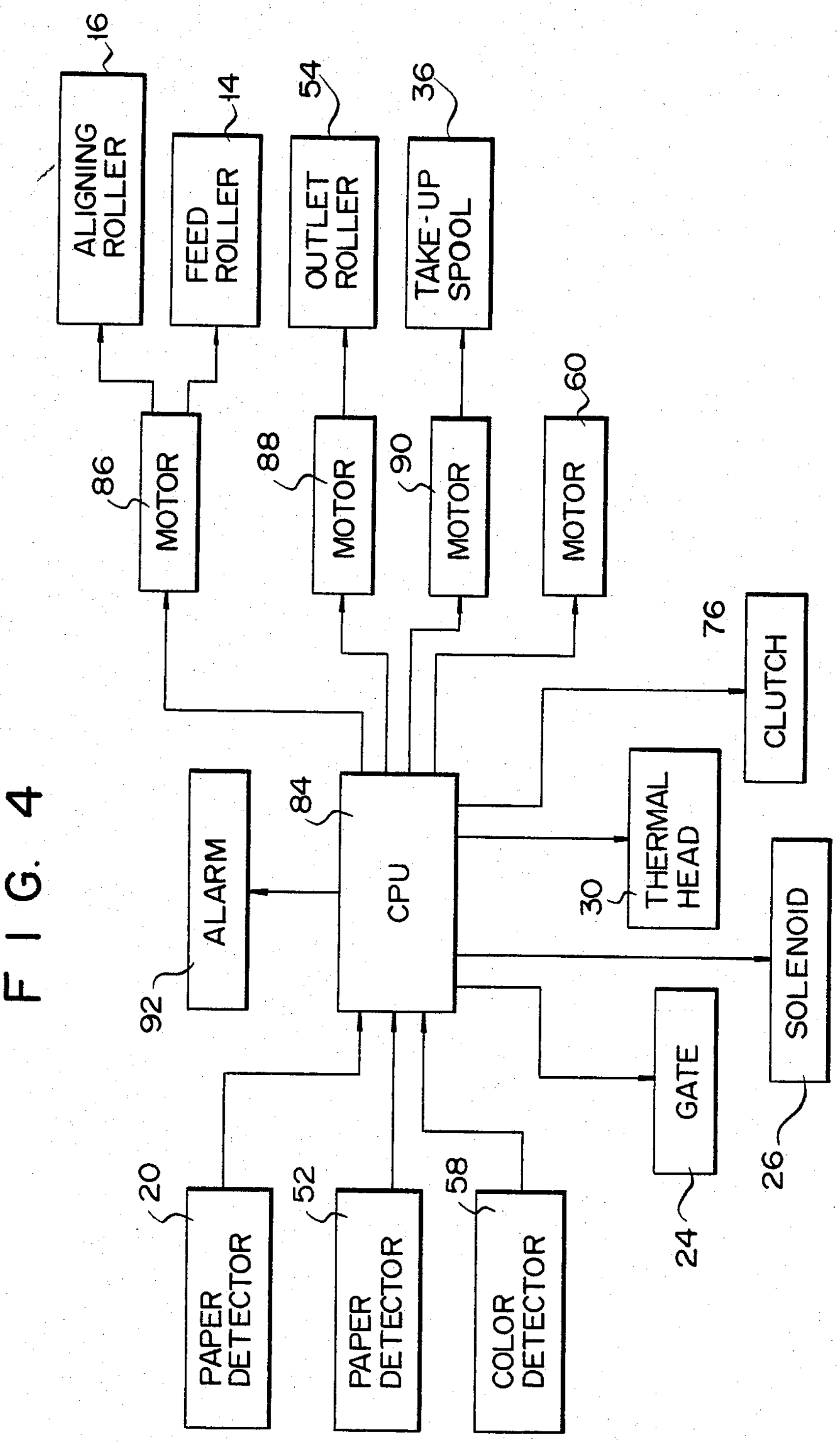
FIG. 4 is a block diagram showing a control circuit employed for the whole of the device.

FIG. 4 is a block diagram showing a circuit for controlling the whole of the device. Signals for detecting the front and last ends of the paper sheet are applied from the paper detectors 20 and 52 to a CPU 84 while a signal for detecting the color of the color area of the ink ribbon 34 is applied from the color detector 58 to the CPU 84. Various kinds of control signals are supplied from the CPU 84 to a motor 86 for driving the paper feed roller 14 and the aligning rollers 16, a motor 88 for driving the outlet roller 54, a motor 90 for driving the take-up spool 36, and also to the gate 24, solenoid 26, thermal head 30, driving motor 60 and electromagnetic clutch 76. An alarm 92 is also connected to the CPU 84 to give an alarm when any mistake is caused in the course of feeding the paper. This mistake represents the case, e.g. where the last end of the paper 10 is not detected by the paper detector 20 within a predetermined time period since the front end thereof has been detected by the paper detector 20.

The operation of this embodiment will be described below. A paper 10 is picked up from the top of papers piled in the paper supply cassette 12 by means of the paper feed roller 14 and conveyed until its front end is held between the aligning rollers 16. After its front end is aligned by the aligning rollers 16, it is carried to the platen roller 18. At this time, the distributing gate 24 is swung in the clockwise direction in FIG. 1, thereby leaving the path on which it is conveyed undisturbed. When the paper detector 20 detects its front end, the CPU 84 renders the electromagnetic clutch 76 connected and rotates the driving motor 60 in a first direction. The platen roller 18 and the driving roller 46 are thus rotated in the clockwise direction in FIG. 1 according to the rotation of the driving motor 60. The solenoid 26 is deenergized at this time and the thermal head 30 is not contacted with the platen roller 18, thereby leaving a space between the platen roller 18 and the thermal head 30. The paper 10 fed from the aligning rollers 16 is carried between the platen roller 18 and the ink ribbon 32 and then conveyed toward the conveying rollers 50 due to the rotation of the platen roller 18. When the front end of the paper 10 is detected by the paper detector 52, the CPU 84 stops the driving of each of the motors, which is shown in FIG. 5A as a sectional view.

Figure 5A:
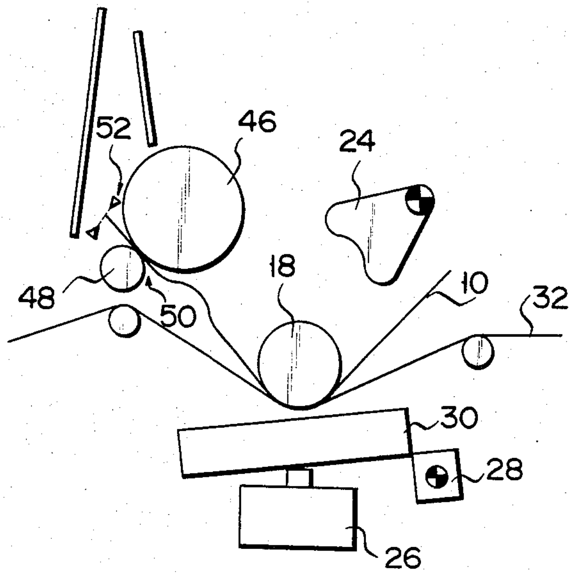
FIGS. 5A to 5D are sectional views showing the main portion of the device to explain the printing operation thereof.
Figure 5B:
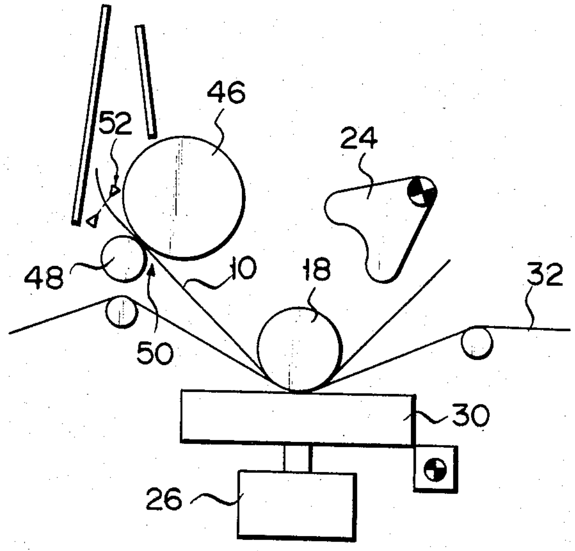

When the front end of the paper 10 is held between the driving roller 46 and the follower roller 48, it is bent between the platen roller 18 and the conveying rollers 50, as shown in FIG. 5A. The CPU 84 renders the electromagnetic clutch 76 disconnected this time. Thereafter, the platen roller 18 serves as a follower. The solenoid 26 is energized and the thermal head 30 is urged against the platen roller 18. For the purpose of removing the bend from the paper sheet 10, the driving motor 60 is then rotated in the first direction only for a predetermined short time period to rotate the driving roller 46 in the clockwise direction, so that the front end of the paper sheet 10 is further conveyed in a forward direction to become free from the bend, which state is shown in FIG. 5B.

The ink ribbon 32 is adjusted in its position in such a way that the front end of the first color (Y, for example) ink area comes to the contact point (or printing point) between the platen roller 18 and the thermal head 30. The CPU 84 drives the driving motor 60 to rotate the driving roller 46 in the first direction, while it drives the driving motor 90 to rotate the take-up spool 36, thereby moving the ink ribbon 32 together with the paper 10. The CPU 84 performs printing for every one line using the thermal head 30 (or the ink Y is transferred for every picture element from the ink ribbon 32 to the paper 10). This printing can be done as long as the paper 10 is held between the conveying rollers 50, thereby enabling the paper 10 to be printed till its last end, which is different from the case of the conventional device.

Figure 5C:
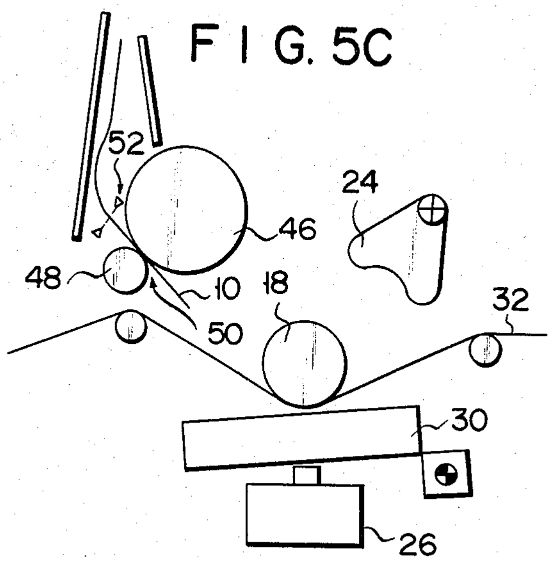

Thus, the first color is printed. The conveyance of the paper 10 finishes when its last end is held between the conveying rollers 50. This is judged according to the lapse of time since its front end is detected by the paper detector 52. When the printing finishes, the solenoid 26 is deenergized and the thermal head 30 is separated from the platen roller 18. The CPU 84 swings the distributing gate 24 in the counter-clockwise direction to become ready for conveying the paper 10 into the paper guides 59A, 59B, i.e. in the reverse direction, which state is shown in FIG. 5C.

Figure 5D:
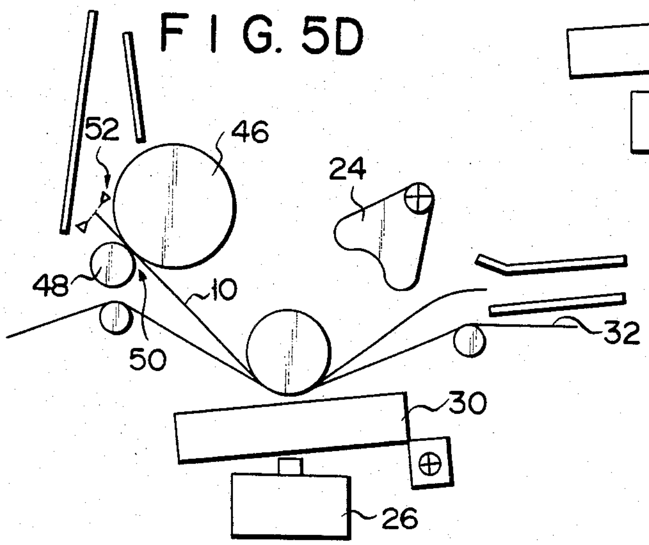
Figure 6:
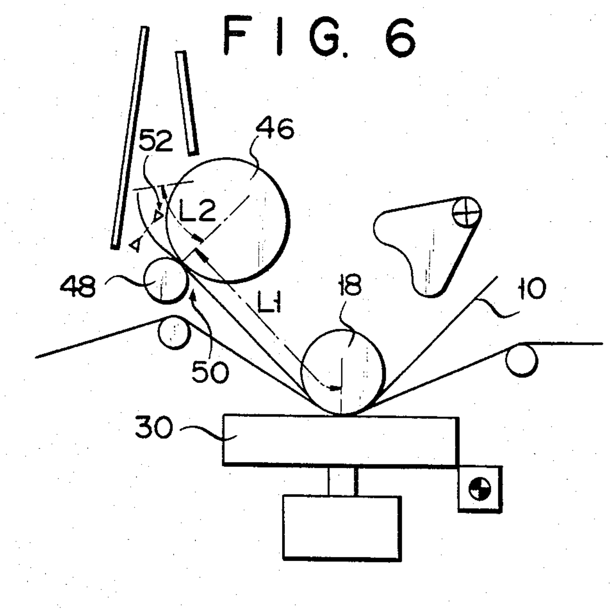
FIG. 6 is a view showing the printing area of the device.

The CPU 84 then rotates the driving motor 60 in a second direction, reverse to the first direction, to rotate the driving roller 46 and the platen roller 18 in the counterclockwise direction, thereby causing the paper 10 to be conveyed in the reverse direction. When the front end of the paper 10 is detected by the paper detector 52, as shown in FIG. 5D, this conveyance in the reverse direction is stopped, then the driving roller 46 is rotated for a predetermined time period in the clockwise direction, similarly when the first color printing starts, in order to remove the bend from the paper 10. Thereafter, the take-up spool 36 is rotated, the front end of the second color (M) ink area of the ink ribbon 32 is moved to the printing point, the solenoid 26 is energized, the thermal head 30 is urged against the platen roller 18, and a state the same as that shown in FIG. 5B is thus produced again, thereby enabling the second color to be printed. The printing of the colors M, C and BK is similarly repeated to color-print the paper 10. The paper 10 on which the four-color printings have been repeated one upon the other is discharged in the paper discharge tray 56 by means of the paper outlet roller 54 where it is stacked.

The paper 10 is held between the driving roller 46 having a large friction coefficient and the follower roller 48 at one point thereof during the printing process and also during the conveyance in the reverse direction, thereby preventing the paper 10 from being bent and skewed. In addition, the surface of the driving roller 46 is made rough so that the projections are stuck to the paper 10 and the position of the paper sheet 10 can be thus controlled exactly, thereby causing no misalignment in color when the colors are printed one upon the other. Further, the paper 10 is held between only the driving and follower rollers 46 and 48 only at the front end thereof during the printing process, so that the entire paper 10 can be printed, except for its front end portion. The area of the paper 10 where printing is made impossible corresponds to the sum of the distance L1 extending from the printing point to the contact point between the follower roller 48 and the driving roller 46, and of another distance L2 extending from the contact point between the follower roller 48 and the driving roller 46 to the front end of the paper 10 which corresponds to that length of the paper 10 which is excessively conveyed to stretch the paper 10. This sum ranges from 25mm to 30mm. This is particularly effective in the case where the sheets of paper cut are employed as the to-be-printed paper as in the case of this embodiment.

According to the present invention, there can be provided an image forming device wherein the paper is printed and reversely conveyed with only its front end held between a pair of conveying rollers, whereby no misalignment in color is caused upon printing the colors one upon the other and whereby printing is made possible till the last end of the paper making the paper more effectively used.

It should be understood that the present invention is not limited to the above-described embodiment. The driving roller 46 which is one of the paired conveying rollers 50 is not limited to the abovementioned example but may be of any type if it has a large friction coefficient. Although the ink ribbon has an ink area which consists of four colors, it may have one color ink area. This case is an example of the image forming device intended to achieve multi-printing. Roll paper sheet as well as cut paper sheets may be employed as the to-be-printed paper.

What is claimed is:

1. An image forming device which thermally transfers color from a transfer paper onto a sheet of paper, comprising:

a platen roller for conveying the paper sheet;

a pair of conveying rollers arranged on that side of the platen roller where the paper sheet comes out of the platen roller in a forward direction;

image forming means for forcing the transfer paper against the platen roller with the paper sheet interposed between them, and heating the transfer paper to thermally multitransfer color onto the paper sheet, while keeping the paper sheet conveyed in the forward direction; and driving means for driving the conveying rollers and not the platen roller when said image forming means is made operative, and driving the platen roller rollers when said image forming means is made inoperative.

2. An image forming device according to claim 1, wherein said conveying rollers include a driving roller which has a large friction coefficient, and a follower roller driven by the driving roller.

3. An image forming device according to claim 2, wherein said driving roller is made of a rigid material such as metal whose surface is coated with a micropowder such as ceramic and tungsten carbide.

4. An image forming device according to claim 1, wherein said transfer paper is an ink ribbon on which a color area of Y (yellow), M (magenta) C (cyan) and BK (black) appears repeatedly for every length of the paper sheet measured in its conveying direction.

5. An image forming device according to claim 1, wherein said driving means includes a driving motor for rotating the driving roller, and a clutch for selectively transmitting the rotation of the driving motor to the platen roller.

6. An image forming device according to claim 1, wherein said conveying rollers convey the paper sheet in the reverse direction to make the paper sheet ready for thermal multitransfer, when one cycle of the thermal transfer finishes.

* * * * *